United States Patent [19]
Wait et al.

[11] Patent Number: 6,088,959
[45] Date of Patent: Jul. 18, 2000

[54] PROCESS FOR CONDITIONING SOIL

[76] Inventors: Thomas R. Wait, 9350 Longmeadow Cir., Boynton Beach, Fla. 33436; Andrew M. Masciarella, 2510 NW. 16th La., Pompano Beach, Fla. 33064-1505

[21] Appl. No.: 09/226,916

[22] Filed: Jan. 5, 1999

[51] Int. Cl.$^7$ .......................... A01B 77/00; A01G 11/00; A01G 13/06; C09K 17/00; F25D 17/06
[52] U.S. Cl. .............................. 47/58.1; 47/1.01; 47/1.42; 47/2; 62/240; 62/286; 62/238.6; 62/428; 405/43; 405/45; 405/36; 405/269
[58] Field of Search ...................... 47/1.01, 1.42, 47/2, 58.1; 62/240, 286, 238.6, 428; 405/43, 45, 36, 269

[56] References Cited

U.S. PATENT DOCUMENTS

| | | | |
|---|---|---|---|
| 5,596,836 | 1/1997 | Benson | 47/1.01 |
| 5,848,536 | 12/1998 | Dodge et al. | 62/240 |

*Primary Examiner*—Lynette R. F. Smith
*Assistant Examiner*—Anne Marie Grünberg
*Attorney, Agent, or Firm*—Howard J. Greenwald

[57] ABSTRACT

A process for conditioning a golf green which preferably is constructed in accordance with the specifications of the United States Golf Association. In this process, air is blown at a flow rate of from about 250 to about 1000 cubic feet per minute onto the top surface of the golf green while simultaneously withdrawing air from said vent side of the main feeder line at a flow rate of from about 250 to about 1,000 cubic feet per minute. A first blower disposed at a distance of less than 30 inches above the golf green is used to blow such air onto the top surface of the green, and the first blower is connected to an air conditioning unit which contains a second blower containing of blower blades and a motor for rotating the blower blades to draw air in a first direction, and expel air in a second direction, a shroud mounted adjacent the second blower, an evaporator coil positioned near the blower within the shroud, a condenser coil operatively positioned within the shroud between the evaporator coil and the second blower, and a compressor operatively connected to the evaporator coil and the condenser coil. The input port of the air conditioning unit is operatively connected to the vent side of the main feeder line.

9 Claims, 5 Drawing Sheets

PROCESS FOR CONDITIONING SOIL

FIELD OF THE INVENTION

A process for conditioning soil, such as golf greens, in which conditioned air is passed through perforated ductwork beneath the soil.

BACKGROUND OF THE INVENTION

Processes for treating soil, such as golf greens, are well known to those skilled in the art. Thus, by way of illustration, several United States patents have issued to William M. Benson of Martinez, Georgia. U.S. Pat. No. 5,433,759 describes a system for treating the soil and turf within a prescribed subsoil profile that includes heat exchanger means comprising a length of air conduit buried beneath the ground. U.S. Pat. No. 5,507,595 describes an apparatus for treating the soil of a grass playing field which includes separator means for removing water from an air stream moving between a blower and a piping system. U.S. Pat. No. 5,542,208 describes an apparatus for treating the soil of a sports field or grass site which includes a flow reversing means for reversing the flow of air through a duct network, comprising a four-way valve mounted upon a mobile unit. U.S. Pat. No. 5,596,836 describes a system for controlling the soil temperature of a grass playing field comprising a blower means having a suction port and a discharge port that is connectable to a duct network. U.S. Pat. No. 5,617,670 discloses an apparatus for treating the soil of a grass sports field that includes valve means operable for selectively connecting a drain line to a duct network, comprising a first valve and a second valve. The disclosure of each of these United States patents is hereby incorporated by reference into this specification.

A system similar to those described in the aforementioned United States is marketed under the name of SUBAIR by SubAir, Inc. Although this system has met with a moderate amount of commercial success, it has not achieved wide acceptance in the golf course industry. A substantial number of customers have complained that the use of such system often damages the drain tile underneath golf greens and damages the roots of the grass of the greens. When damage to the drain tile assemblies of the golf courses occur, the golf greens must be rebuilt, frequently at substantial expense and inconvenience.

Without wishing to be bound to any particular theory, applicants have observed that when the SUBAIR system is used when the ambient air is at least about 90 degrees Fahrenheit, the soil treated with the system is heated rather than cooled, often increasing in temperature by at least about 15 degrees. Similarly, when the SUBAIR system is used when the ambient air is at a temperature of less than about 45 degrees Fahrenheit, the soil treated with the system is cooled rather than heated. Under either of these conditions, the use of the SUBAIR system aggravates rather than remedies the problem it is designed to solve.

It is an object of this invention to provide a system for conditioning soil in which, even under conditions wherein the ambient air is at least about 90 degrees Fahrenheit, the soil will be cooled substantially.

It is another object of this invention to provide a system for conditioning soil in which, even under conditions wherein the ambient air is less than about 45 degrees Fahrenheit, the soil will be heated substantially.

It is yet another object of this invention to provide an improved apparatus for conditioning soil.

SUMMARY OF THE INVENTION

In accordance with this invention, there is provided a process for conditioning soil in which, with the use of a specified air conditioner, air is flowed through perforated ductwork underneath the soil at flow rate of from about 250 to about 1,000 cubic feet per minute.

BRIEF DESCRIPTION OF THE DRAWINGS

The invention will be described by reference to the following specification and to the drawings, in which like numerals refer to like elements, and in which.

DESCRIPTION OF THE PREFERRED EMBODIMENTS

In one preferred embodiment of the invention, an air conditioning/heating unit is used to provide air for the soil to be conditioned. This air conditioning unit preferably is described in U.S. Pat. No. 5,848,536, the entire disclosure of which is hereby incorporated by reference into this specification.

Figure 1:
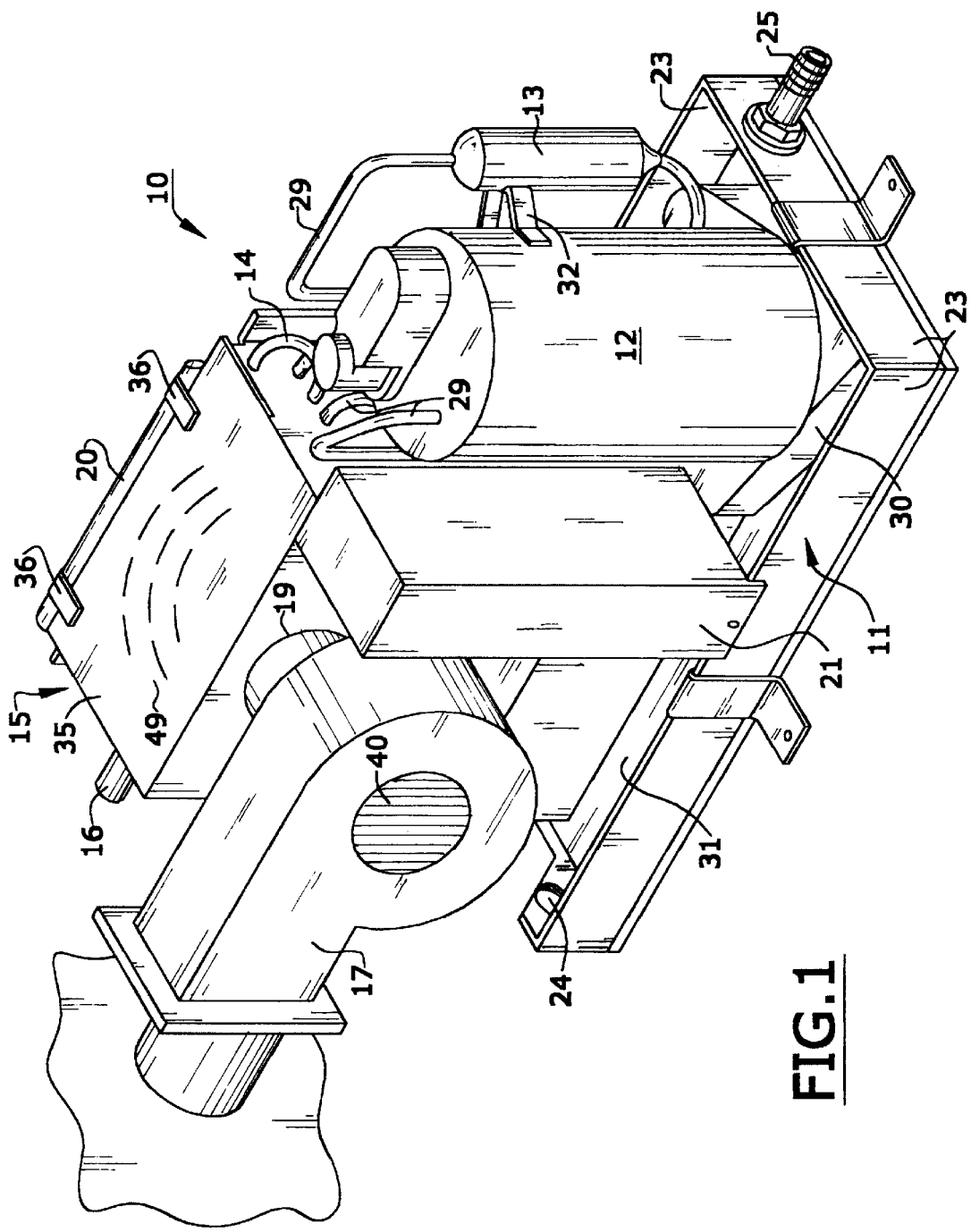
FIG. 1 is a perspective view of one preferred air conditioning unit of this invention.

FIG. 1 is a schematic view of one preferred air conditioning unit 10. The air conditioning unit depicted in FIG. 1 preferably comprises (1) blower including blower blades and a motor for rotating the blower blades to draw air in a first direction, and expel air in a second direction, (2) a shroud mounted adjacent the blower, (3) an evaporator coil positioned near such blower within such should so that air drawn by the blower in the first direction passes the evaporator coil, (4) a condenser coil operatively positioned within the shroud between the evaporator coil and the blower so that air drawn by the blower in the first direction passes through the evaporator coil and then passes the condenser coil and into the blower, and (5) a compressor operatively connected to the evaporator coil and the condenser coil. Applicants have discovered that, when this particular air conditioner is used in connection with applicants' process, applicants can achieve all of the desirable advantages of prior art soil conditioning processes without their substantial disadvantages.

The preferred air conditioning unit used in the process of the invention is comprised of a water inlet. During operation of this unit, water is preferably fed through the unit at a rate of at least about 7 gallons per minute; it is preferred, however, that the water pressure is less than about 25 pounds per square inch. The use of such a system allows the production of conditioned air at a flow rate of from about 250 to about 1,000 cubic feet per minute. The conditioned air may be either cooler than the ambient air (generally from about 20 to about 30 degrees Fahrenheit cooler than such ambient air) or warmer than such ambient air (generally from about 20 to about 30 degrees warmer than such ambient air). The preferred air conditioning unit is capable of providing either cooled air, or heated air.

The water may be provided, e.g., from a water source near the golf course such as, e.g., a pond. Thus, e.g., water may be withdrawn from such pond, and returned to such pond, by the preferred air conditioning unit.

Referring to FIG. 1, and in the preferred embodiment depicted therein, it will be seen that air conditioner 10 is comprised of a base condensate pan 11, a rotary compressor 12, a suction accumulator 13, an evaporator coil 14, a water inlet 15, and an outlet 16 to an internal condenser coil 49 (shown in dotted line outline within shroud 35). The coils 14 are partially within shroud 35, as is an internal condenser coil 49. The air conditioner 10 also is comprised of a blower 17 comprised of a motor 40, a duct ring 19, an air sensor 20, an and electrical box 21.

The base/condensate pan 11 preferably consists essentially of stainless steel or like strong, corrosion-resistant material, and it supports the other components in any suitable manner such as, e.g., by means of pedestals, connection of components to the pan walls 23, and the like. The pan is also deep, preferably being at least about 1.5 inches, and in one embodiment being at least about 1.75 inches (i.e., the interior height of each wall 23 is at least about 1.75"). It is preferred that at least two widely spaced drain openings, with fittings 25 and/or plugs 24, be provided for condensate. In one embodiment, the drain fitting 25 is a conventional polyvinyl chloride fitting identified as "½" HB×½" MPT." Fitting 25 preferably cooperates with a solid washer (not shown in FIG. 1) and liquid seal washer (not shown in FIG. 1) on the outside of the wall 23 and is preferably held to the base pan 11 by means of a locking nut (not shown). Two or more remotely spaced openings/plugs 24 are provided to allow flexibility of installation.

The compressor 12 preferably is a high efficiency rotary compressor, such as those manufactured by the Tecumseh Company of Tecumseh, Mich. It is preferably connected to the suction accumulator 13, a raised lance fin designed evaporator coil 14, which is connected to inlet 15 and outlet 16 by conduits 29 for transporting refrigerant, and other materials, in a conventional manner. Preferably the compressor 12 is mounted on a pedestal 30 which is supported on the floor 31 of the pan 11, and the accumulator 13 is preferably mounted by a bracket 32 directly to the compressor 12. The shroud 35 with the the coils therein is preferably either mounted on its own pedestal (not shown) or directly to the floor 31 of the pan 11.

The blower 17 is preferably powered by electric motor 40 to discharge cooled or heated air through the duct ring 19. For flexibility and ease of installation, the blower 17 is preferably mounted so that the duct ring 19 may preferably be oriented horizontally.

The air sensor 20 is preferably mounted by brackets 36 to the housing 35; it functions to monitor the air temperature, and it is controlled by a thermostat, not shown.

The pan 11 preferably is mounted on a firm, level, horizontal surface. Mounting is readily accomplished using the mounting brackets (not shown) which preferably are made of metal and have a hooked end which goes over the top of wall 23.

In one preferred embodiment, the unit 10 weighs less than about 120 pounds. In another preferred embodiment, unit 10 is comprised of a time clock (not shown). In another embodiment, the unit 10 is comprised of a first thermostat which prevents its heating mode from being used when the ambient temperature is above a certain specified limit, and a second thermostat which prevents is cooling mode from being used when the ambient temperature is below a certain specified limit.

Figure 2:
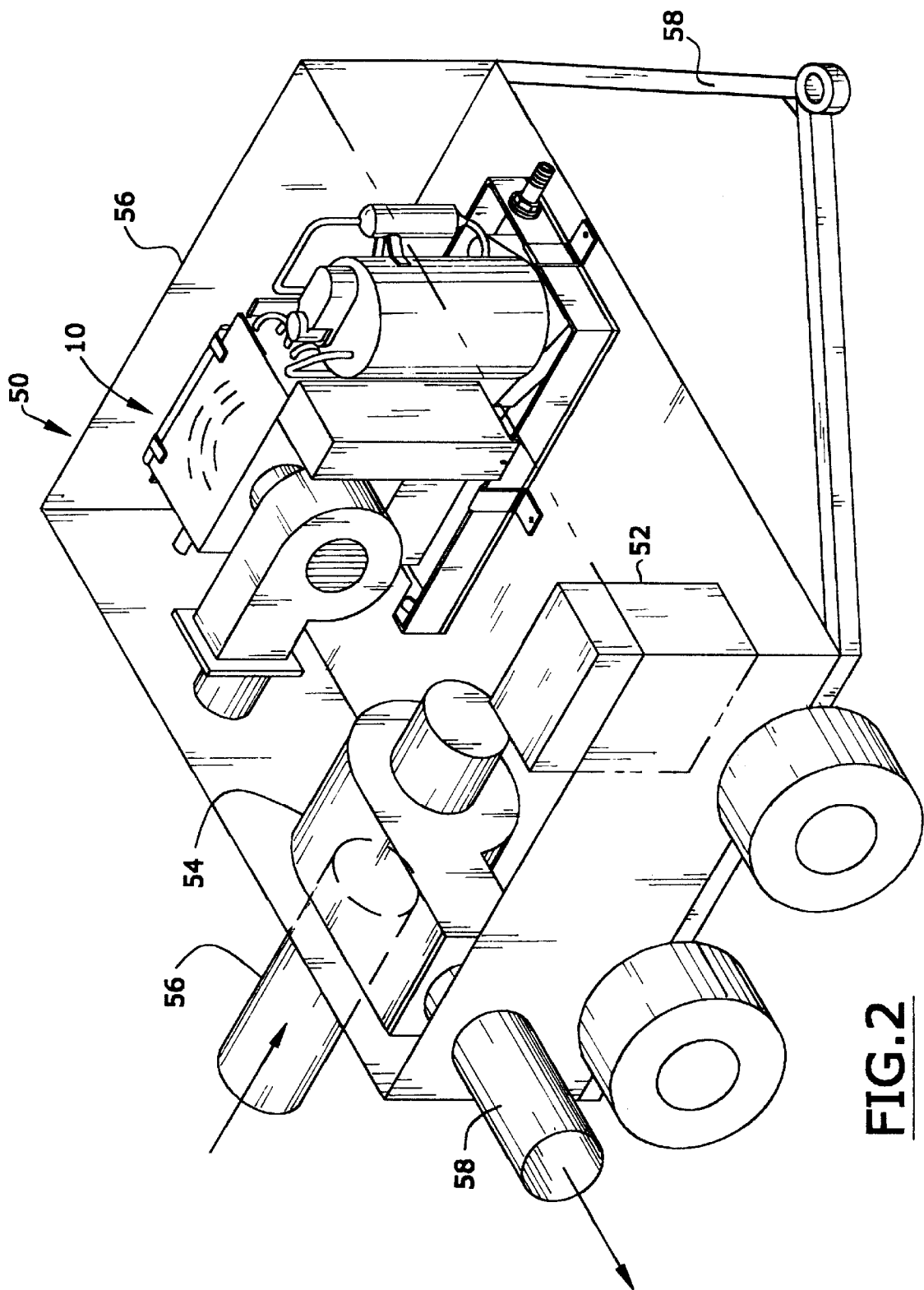
FIG. 2 is a schematic view of one preferred mobile air conditioning system of the invention.

FIG. 2 is a schematic view of one preferred mobile air conditioning system 50 which is comprised of air conditioning unit 10 (see FIG. 1), a generator 52, and a blower 54, all mounted on a movable trailer 56. The trailer 56 may be connected to a motorized vehicle by means of hitch 58 and taken to, or removed from, any site at which one desires to condition soil. For the sake of simplicity of representation, input and output hoses have been omitted from this Figure.

The air conditioning unit 10 is identical to the unit 10 depicted in FIG. 1. For the sake of simplicity of representation, numerals describing the component parts of this unit have been omitted from this Figure.

The generator 52 is operatively connected to both the air conditioning unit 10 and the blower 54. It preferably is powered by an organic fuel source such as propane, diesel fuel, or gasoline.

It one preferred embodiment, generator 52 is a diesel fuel powered generator. Diesel fuel powered generators are well known to those skilled in the art and are described, e.g., in U.S. Pat. Nos. 5,833,294, 5,718,015, 5,335,854, 5,285,604, 5,266,220, 5,244,579, and the like. The disclosure of each of these United States patents is hereby incorporated herein by reference into this specification.

Referring again to FIG. 2, it will be seen that the generator 52 is also operatively connected to blower 54. In the preferred embodiment illustrated, blower 54 is comprised of an inlet port 56 and an outlet port 58. When the inlet port 56 is operatively connected to ductwork beneath the soil, it provides suction to withdraw gaseous material within such soil. In general, it is preferred that the suction provided be sufficient to move air at a rate of from about 250 to about 1,000 cubic feet per minute.

Without wishing to be bound to any particular theory, applicants believe that, because of the unique combination of conditions used in their process, the gaseous material withdrawn from such soil generally vents into the atmosphere.

Figure 3:
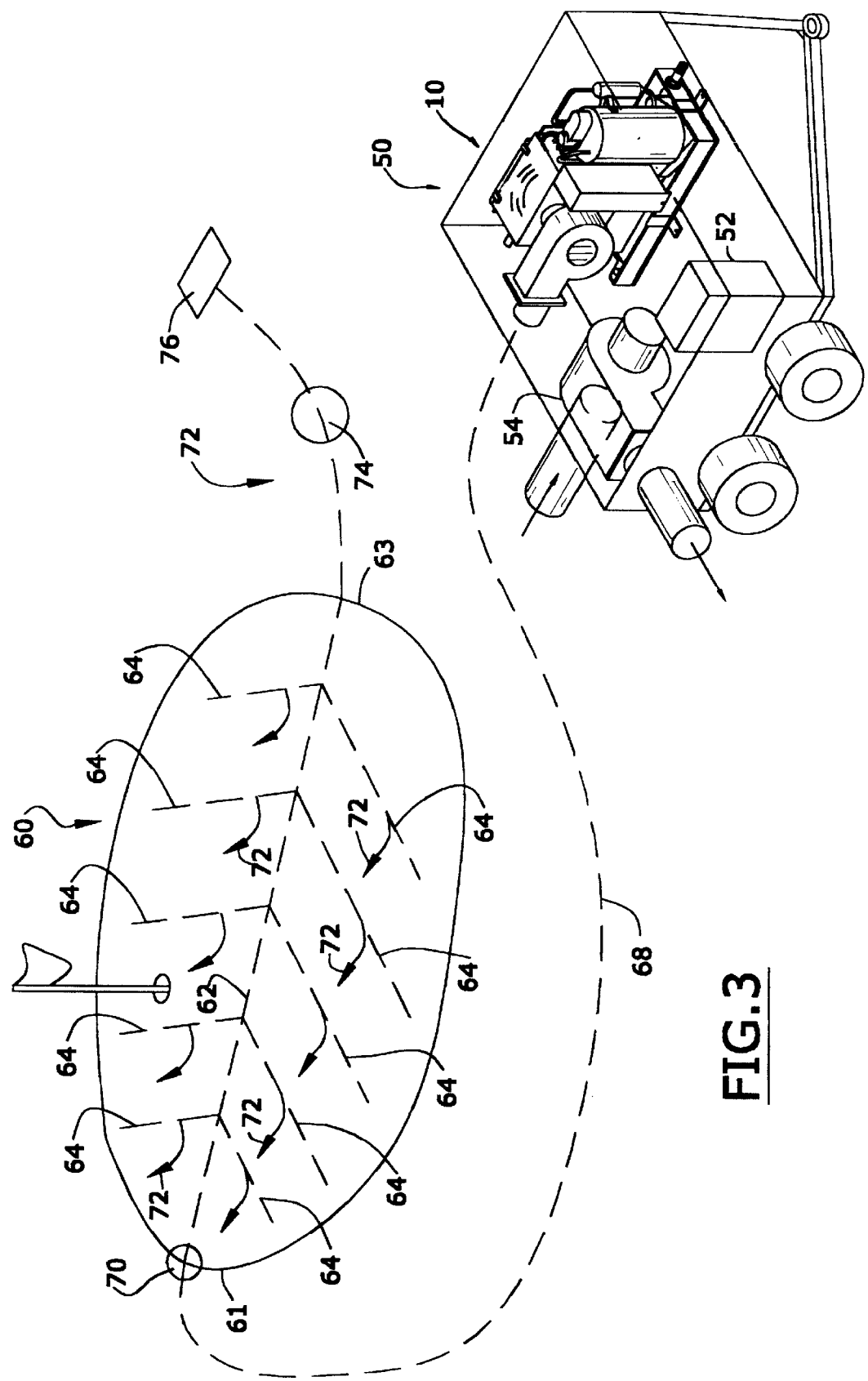
FIGS. 3, 4, and 5 are schematic views illustrating how the system of FIG. 2 may be used to treat a golf green.

FIG. 3 is a schematic representation showing the use of system 50 with preferred golf green 60. As is described in column 3 of U.S. Pat. No. 5,596,836, the golf green 60 preferably is one that has been constructed in compliance with the specifications of the United States Golf Association (USGA). This green preferably includes a top layer that supports a grass turf. The top layer preferably is about twelve inches deep and contains a mix that is 80 percent fine sand and 20 percent organic matter (which is typically peat moss). Immediately below the top layer is an intermediate layer that is about two to about four inches deep and preferably contains choker sand. Finally, a lower layer of pea gravel about four inches deep is placed directly below the choker sand layer.

Typically buried in the subsoil of the green is a duct network that is in communication with the lower level gravel bed and serves to carry excess water in the subsoil region away from the green. The duct network generally includes one or more main feeder lines that are interconnected to a series of distribution lines. The lines are preferably arranged in a herringbone pattern that encompasses the green area. The lines have openings (perforations) that permit excess moisture in the soil be collected in the lines. The lines are preferably laid in the ground so that the collected moisture is gravity fed to the drainage system servicing the golf course.

The standard golf green construction mandated by the U.S.G.A. is well known and is described, e.g., in U.S. Pat. Nos. 5,752,784, 5,636,473, 5,634,294, 5,617,670, 5,596, 836, 5,542,208, 5,507,595, 5,433,759, and the like. The disclosure of each of these United States patents is hereby 219 incorporated by reference into this specification.

Referring again to FIG. 3, and in the preferred embodiment depicted therein, it will be seen that main feeder line 62 feeds perforated feeder lines lines 64. In the embodiment depicted in FIG. 3, conditioned air (which either may be heated air or cooled air) is fed via line 68 (which may be a flexible hose) to main distribution line 62 and perforated feeder lines 64. The line 68 is fed to the vent side 70 of green 60, and the air thus fed to lines 64 ultimately flows upwardly through the soil in the direction of arrows 72.

The conditioned air is generally from about 20 to about 30 degrees Fahrenheit different than the ambient air.

Referring again to FIG. 3, it will be seen that a drain system 72 is tied in under the green duct network. It is preferably comprised of a slide valve 74 and enters into a collector 76, which may be a storm drain. As will be apparent, with the use of such a slide valve 74, one can manually adjust the extent to which, if any, pressure is created within main feed line 62. When the slide valve 74, e.g., is closed, the pressure buildup within the main feed line 62 is maximized.

Referring again to FIG. 3, it will be seen that standard U.S.G.A. green 60 has a vent side 61 (which is often referred to as a "flush out"), which preferably is located on the top or the high point or the back of green 60, and a drain side 63 (which is often referred to as "drain exit"), which is usually located at the low point, or bottom of the green 60.

Figure 4:
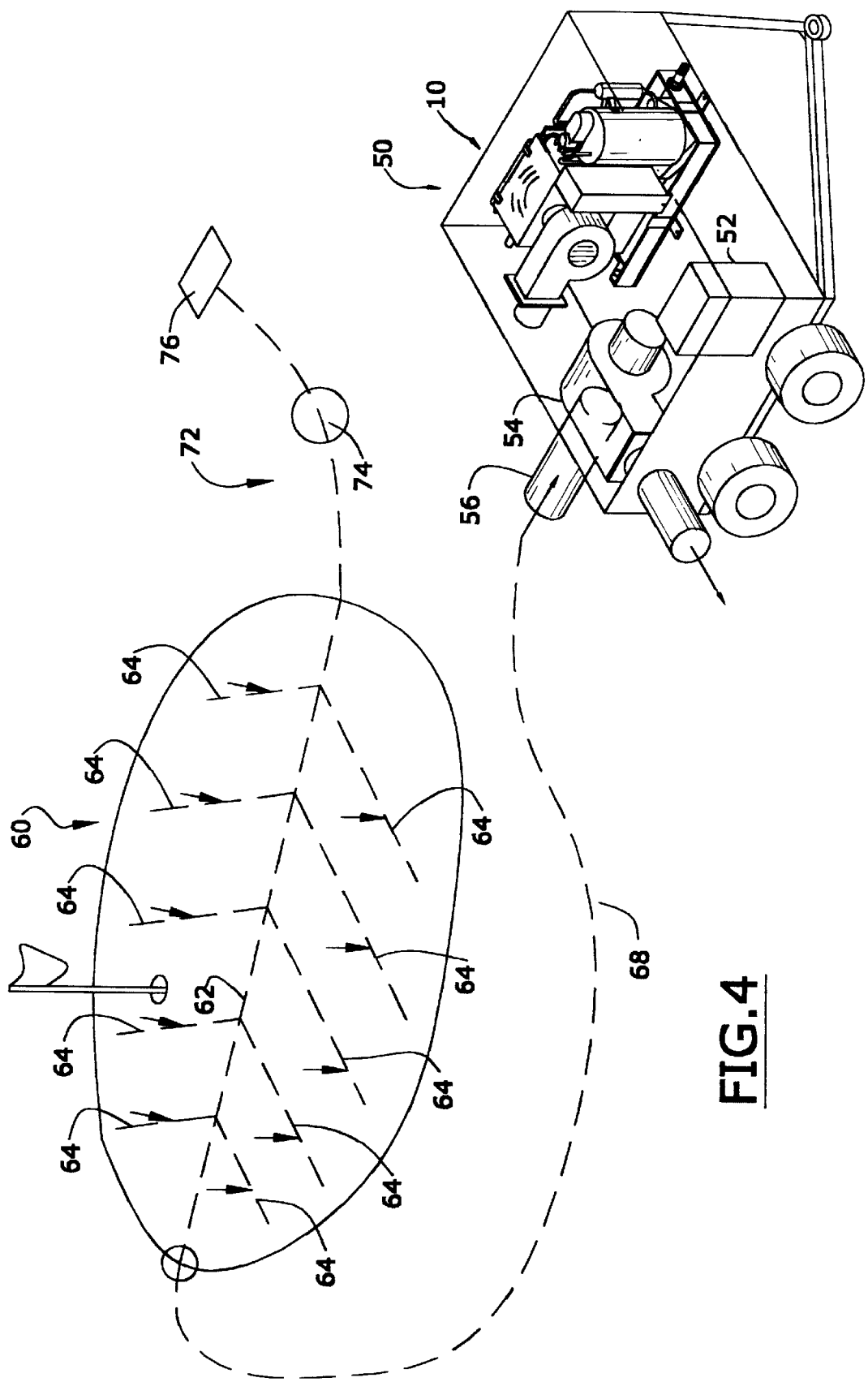

The process illustrated in FIG. 4 is similar to that depicted in FIG. 3, with the exception that the line 68 is connected to the inlet port 56 of blower 54 in order to pull air, moisture, and gaseous material from golf green 60 into its existing drain network. Because of the process parameters used in applicants' system, which are described elsewhere in this specification, the undesirable gaseous materials are caused to settle below the golf green 60 and carried off to a larger drainage system servicing the golf course. By comparison, and as is disclosed in column 1 of U.S. Pat. No. 5,507,595, "When the blower is operating in a suction mode, excessive water found in the subsoil profile can be pulled into the rotating stages of the machine where it can produce excessive wear and corrosion of the rotor, the machine, and stator parts. If the green has been treated with fertilizer or other chemicals, the corrosion process is greatly accelerated."

Figure 5:
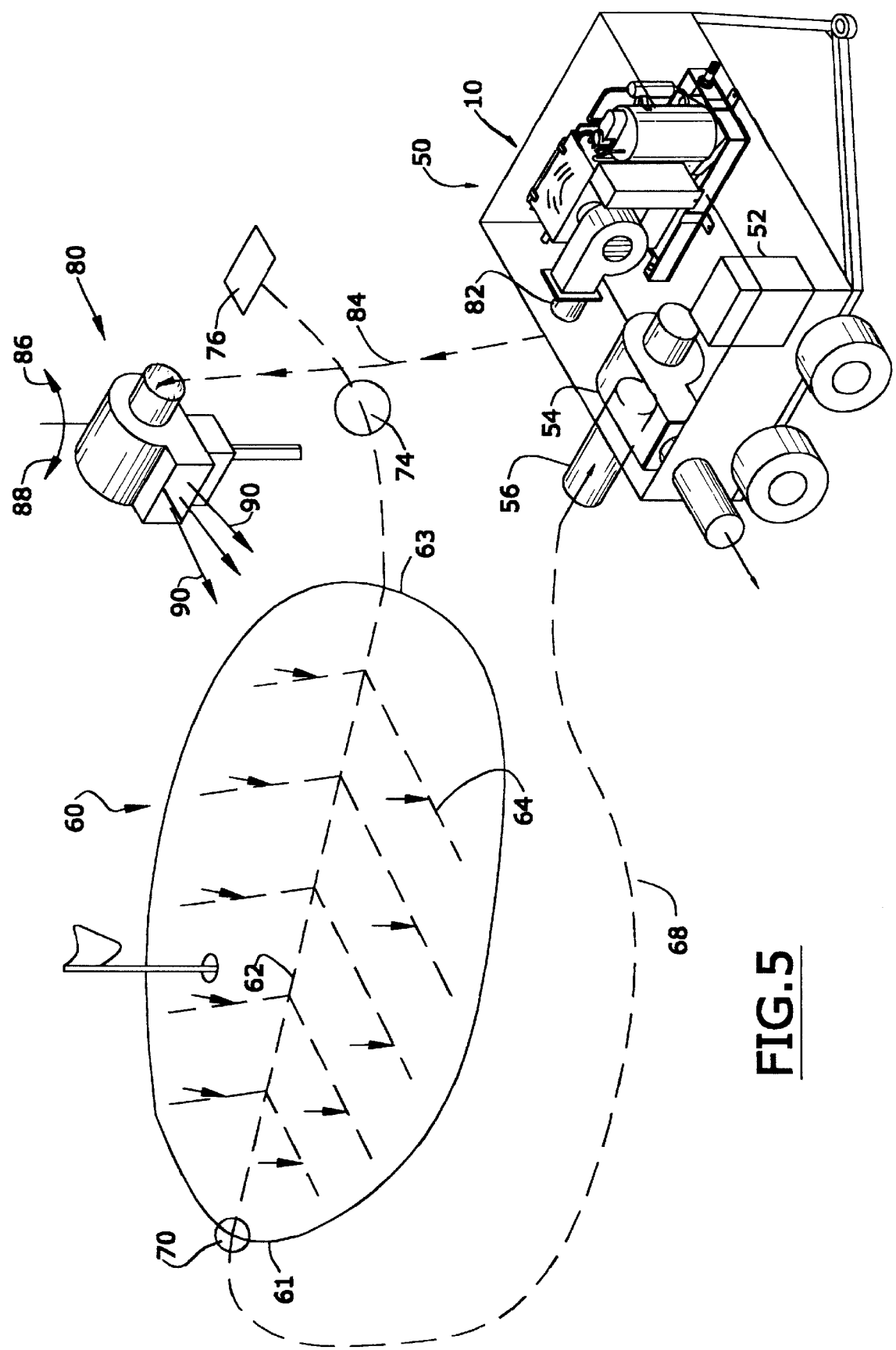

The process illustrated in FIG. 5 is similar to the process illustrated in FIG. 4, with the exception that an above ground blower 80 is used to blow air across golf green 60. In the embodiment depicted in FIG. 5, a blower 80 is shown; alternatively, a fan (not shown) may be used.

The blower 80 is preferably an oscillating blower. Oscillating blowers are well known to those skilled in the art and are described, e.g., in U.S. Pat. No. 5,622,036 (oscillating blower for removing fruit from trees), U.S. Pat. Nos. 4,375,710, 4,351,082, 4,078,365, 3,635,004, 3,556,327, and the like. The disclosure of each of these United States patents is hereby incorporated by reference into this specification.

Referring again to FIG. 5, it will be seen that oscillating blower 80 is connected to the discharge port 82 of air conditioning unit 10 via line 84. In operation, blower 80 is caused to oscillate in the direction of arrows 86 and 88 while discharging air in the direction of arrows 90. As will be apparent, in this embodiment the green 60 is simultaneously subjected to arrow being blown onto it by blower 80 and suction being applied to it by blower 54, thereby effectively conditioning the soil without harming it or its associated structure.

The blower 80 is preferably disposed at a distance of less than about 30 inches above the top surface of the golf green 60. It may be disposed above the top surface of the golf green. In the preferred embodiment depicted in FIG. 5, it is disposed in front of the golf green. In either event, the blower 80 should be disposed at a distance less than 15 feet from the golf green 60.

We claim:

1. A process for conditioning a golf green wherein said golf green is comprised of a top surface, a vent side, a drain side, and a main feeder line connected to said vent side and to said drain side and disposed beneath said top surface of said golf course, comprising the steps of blowing air at a flow rate of from about 250 to about 1000 cubic feet per minute onto the top surface of said golf green while simultaneously withdrawing air from said vent side of said main feeder line at a flow rate of from about 250 to about 1,000 cubic feet per minute, wherein said air is blown onto said top surface of said golf green by a first blower, and wherein:

(a) said first blower is disposed at a distance of less than 30 inches above the top surface of said golf green, (b) said first blower is operatively connected to the output port of an air conditioning unit, wherein said air conditioning unit is comprised of:
  1. a second blower comprised of blower blades and a motor for rotating said blower blades to draw air in a first direction, and expel air in a second direction,
  2. a shroud mounted adjacent said blower,
  3. an evaporator coil positioned near said second blower within such shroud so that air drawn by said second blower in the said first direction passes said evaporator coil,
  4. a condenser coil operatively positioned within the shroud between said evaporator coil and said second blower so that air drawn by the second blower in the first direction passes through said evaporator coil and then passes said condenser coil and into said blower, and
  5. a compressor operatively connected to said evaporator coil and said condenser coil; and (c) said input port of said air conditioning unit is operatively connected to said vent side of said main feeder line.

2. The process as recited in claim 1, wherein water is fed to said air conditioning unit at a flow rate of at least about 7 gallons per minute.

3. The process as recited in claim 2, wherein the pressure of said water fed to said air conditioning unit is less than about 25 pounds per square inch.

4. The process as recited in claim 3, wherein said air conditioning unit provides cooled air to said first blower.

5. The process as recited in claim 3, wherein said air conditioning unit provides heated air to said first blower.

6. The process as recited in claim 3, further comprising the step of discharging said water from said air conditioning unit at a rate of at least about 7 gallons per minute.

7. The process as recited in claim 1, wherein said air conditioning unit weighs less than about 120 pounds.

8. The process as recited in claim 1, wherein said first blower is an oscillating blower.

9. The process as recited in claim 1, wherein said first blower is disposed at a distance of less than about fifteen feet from said golf green.

\* \* \* \* \*